(12) United States Patent
Peden et al.

(10) Patent No.: US 7,500,006 B2
(45) Date of Patent: *Mar. 3, 2009

(54) TICKETING AND KEYING FOR ORCHESTRATING DISTRIBUTION OF NETWORK CONTENT

(75) Inventors: George H. Peden, Portland, OR (US); Robert A. Marshall, Portland, OR (US)

(73) Assignee: Intertrust Technologies Corp., Sunnyvale, CA (US)

( * ) Notice: Subject to any disclaimer, the term of this patent is extended or adjusted under 35 U.S.C. 154(b) by 554 days.

This patent is subject to a terminal disclaimer.

(21) Appl. No.: 11/170,966

(22) Filed: Jun. 29, 2005

(65) Prior Publication Data

US 2006/0031249 A1 Feb. 9, 2006

Related U.S. Application Data

(63) Continuation of application No. 09/544,898, filed on Apr. 7, 2000, now Pat. No. 6,973,499.

(51) Int. Cl.
*G06F 15/16* (2006.01)

(52) U.S. Cl. .................. 709/229; 709/225; 709/226; 709/223; 709/217; 709/231; 709/232; 709/227

(58) Field of Classification Search ................ 709/229, 709/227, 223, 217, 225, 226, 231, 232
See application file for complete search history.

(56) References Cited

U.S. PATENT DOCUMENTS

| | | | |
|---|---|---|---|
| 5,455,953 A * | 10/1995 | Russell | 710/266 |
| 5,893,910 A | 4/1999 | Martineau et al. | |
| 5,941,947 A | 8/1999 | Brown et al. | |
| 6,085,238 A * | 7/2000 | Yuasa et al. | 709/223 |
| 6,098,056 A | 8/2000 | Rusnak et al. | |
| 6,108,706 A | 8/2000 | Birdwell et al. | |
| 6,216,132 B1 | 4/2001 | Chandra et al. | |
| 6,385,647 B1 | 5/2002 | Willis et al. | |
| 6,389,475 B1 | 5/2002 | Speakman et al. | |
| 6,393,484 B1 * | 5/2002 | Massarani | 709/227 |
| 6,438,549 B1 | 8/2002 | Aldred et al. | |
| 6,438,618 B1 | 8/2002 | Lortz et al. | |
| 6,463,418 B1 | 10/2002 | Todd | |
| 6,470,354 B1 | 10/2002 | Aldridge et al. | |
| 6,477,559 B1 * | 11/2002 | Veluvali et al. | 718/101 |
| 6,507,727 B1 | 1/2003 | Henrick | |
| 6,512,776 B1 | 1/2003 | Jones et al. | |
| 6,519,615 B1 * | 2/2003 | Wollrath et al. | 707/206 |
| 6,526,438 B1 | 2/2003 | Bienvenu et al. | |
| 6,973,499 B1 * | 12/2005 | Peden et al. | 709/229 |

* cited by examiner

*Primary Examiner*—Ario Etienne
*Assistant Examiner*—Sahera Halim
(74) *Attorney, Agent, or Firm*—Finnegan, Henderson, Farabow, Garrett & Dunner LLP

(57) ABSTRACT

One embodiment of an inventive networking environment includes clients called sending clients because they send network content through a network, and clients called receiving clients because they receive the network content from the sending clients through the network. Both sending clients and receiving clients are "clients" in that they rely on a management server to orchestrate the secure transfer of information from sending clients to receiving clients.

36 Claims, 15 Drawing Sheets

TICKETING AND KEYING FOR ORCHESTRATING DISTRIBUTION OF NETWORK CONTENT

RELATED CASES

This application is a continuation application of U.S. application Ser. No. 09/544,898, filed April 7, 2000 now U.S. Pat. No. 6,973,499. This application is hereby incorporated by reference, into this application, in its entirety.

This application is related to U.S. application Ser. No. 09/544,493, filed on Apr. 7, 2000 (now U.S. Pat. No. 7,266, 681, issued Sept. 4, 2007), and U.S. application Ser. No. 09/544,795, filed on Apr. 7, 2000 (now U.S. Pat. No. 7,085, 839, issued Aug. 1, 2006).

FIELD OF THE INVENTION

The present invention pertains to the field of networking. More particularly, this invention relates to distribution of network content.

BACKGROUND OF THE INVENTION

Traditional approaches to network content management are widely used today by a variety of entities such as pay television providers, corporate networks, and members only Internet websites. These traditional approaches usually rely on maintaining groups of users who are eligible to receive certain content. Many different kinds of relationships and security schemes are used to associate users and content. For instance, a corporate network may include several different groups of users who are eligible to access different groups of content based on job description and need to know. A vice president of corporation finance may belong to one group of users that has access to financial files, and an engineer may belong to another group of users that has access to a completely separate set of purely technical files. All of the corporate users may belong to yet another group of users that has access to general corporate information like a community bulletin board, a schedule of company social events, etc. Depending on who a user is, the user may or may not have authority to read, write, execute, and/or delete content stored in a file structure on the network.

In a pay television network, certain viewers will have purchased only the basic television channels and other users will have purchased one or more premium channels or packages of channels, such as sports packages for particular professional teams. Channels that a viewer has not paid for are generally scrambled. With potentially hundreds of thousand or even millions of viewers, and potentially hundreds of different channel packages, the associations and security controls among viewers and content are likely to be very complex.

As the number of users on a network increases, and as the volume of content distributed over the network increases, managing the distribution of content becomes more difficult. This is particularly true as networks become more interactive and more dynamic. The Internet provides a good example of a difficult network to manage. The size of the Internet and the dynamic nature of the Internet make content management particularly challenging.

The number of people and organizations connected to the Internet continues to increase virtually every day. At the same time, the volume of information available on the Internet continues to increase. People can add new content, delete content, decide to access different content, search for new content, etc., on the spur of the moment. A content provider never knows what to expect. If a content provider attracts too much attention, the provider can become overwhelmed with traffic, essentially shutting down the provider. On the other hand, a content provider can easily become lost in the vast virtual expense of the Internet and receive very little traffic if any at all.

As the Internet and broadcast services merge, the content management challenges will continue to increase. For instance, for an existing pay television networks the number of users and volume of content is likely to be large, but the content and user groups are comparatively static. That is, the pay television provider can usually predict what television channels it is going to provide, and the typical user probably will not change his or her package of channels very often. Changes to content and user groups can be managed over the course of days or weeks.

In an Internet environment, however, the dynamic nature of user groups and content could drastically change. An Internet-based pay television service could be entirely pay-per-view, resulting in huge fluctuations in the number of users. For instance, the release of a particularly popular movie could attract too many viewers and shut down the content server. Multicasting can alleviate some of the difficulties with network content that is in high demand by transmitting a data stream that viewers can simply pick up in the network, analogous to a broadcast television signal from an antenna. Providing security for a multicast, however, provides additional changes. A large number of viewers may want to access the content, and each viewer will generally need to obtain a decryption key from the content provider in order to make use of the data stream. A large number of requests for decryption keys can overwhelm a server just like a large number of requests for any other kind of data.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The networking environment described below embodies a number of inventions for improving network content management. Embodiments of one invention are claimed in the present patent and embodiments of other inventions are claimed in the related patents.

Figure 1:
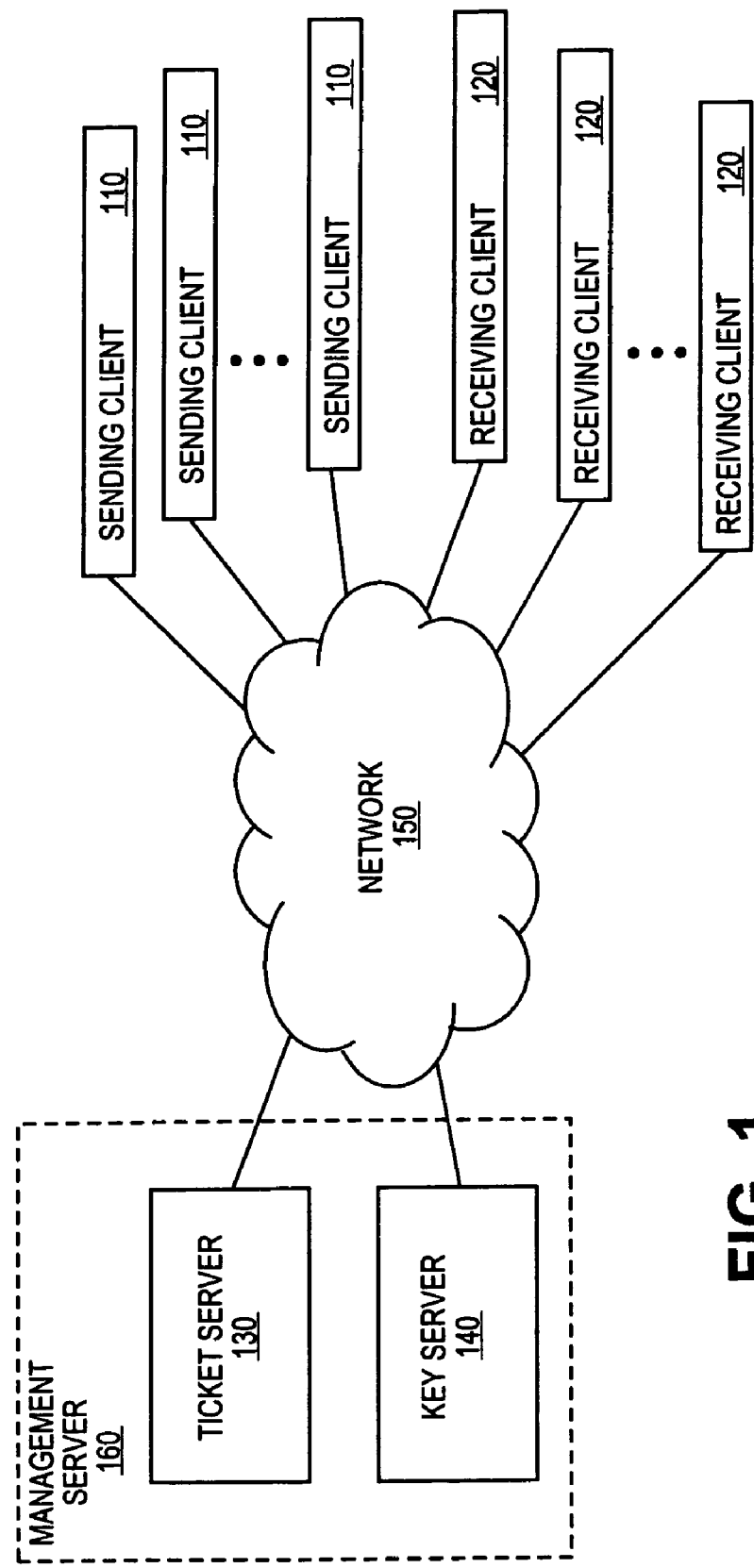
FIG. 1 illustrates one embodiment of a network environment.

FIG. 1 illustrates one embodiment of the inventive networking environment. Clients 110 are called sending clients because they send network content through network 150. Clients 120 are called receiving clients because they receive the network content from the sending clients through network 150. Both sending clients 110 and receiving clients 120 are "clients" in that they rely on management server 160 to orchestrate the secure transfer of information from sending clients 110 to receiving clients 120.

Relying on management server 160 to orchestrate content management provides numerous advantages. One advantage in particular is that managing access to content at a server reduces the volume of data traffic on individual clients.

Management server 160 includes ticket server 130 and key server 140. In the illustrated embodiment, management server 160 is shown in dotted lines because ticket server 130 and key server 140 need not be located together. That is, key server 140 and ticket server 130 can be located at separate locations and on separate machines. In various embodiments, as discussed below, key server 140 may be located in a secure location to reduce the likelihood of tampering with keying information.

Network content can represent any form of data, including data files, multicast data, multimedia data, interactive data, etc. Network content will usually be referred to herein as events or sessions. Examples of events are a multicast presentation of a feature length movie, providing access to a file, and providing access to an interactive gaming environment.

In one embodiment, network 150 represents the Internet. In alternate embodiments, network 150 represents a private or corporate network.

Various embodiments of the inventive networking environment are particularly suited for multicasting events, although they work well for unicast events too. Multicasting is a data transmission from one sending client 110 to multiple receiving clients 120. Each client accesses ticket server 130 to be authorized for the event. If a client is authorized, it will learn when and where a multicast event will occur as well as where to go to get a security key to participate in the event. In the illustrated embodiment, each client is instructed to get the security key from key server 140. Alternate embodiments may include several different key servers 140 located throughout network 150, and each key server may be associated with different events or sets of events in order to distribute the server load for key requests.

Around the time a multicast event is supposed to start, each authorized client accesses key server 140 to obtain a key for the event. In one embodiment, the key is a "symmetric" cryptographic key. A key is "symmetric" in that both the sending client and the receiving client use the same key. When the event actually begins, the sending client uses the key to encrypt the multicast and each receiving client uses the key to decrypt it.

Figure 2:
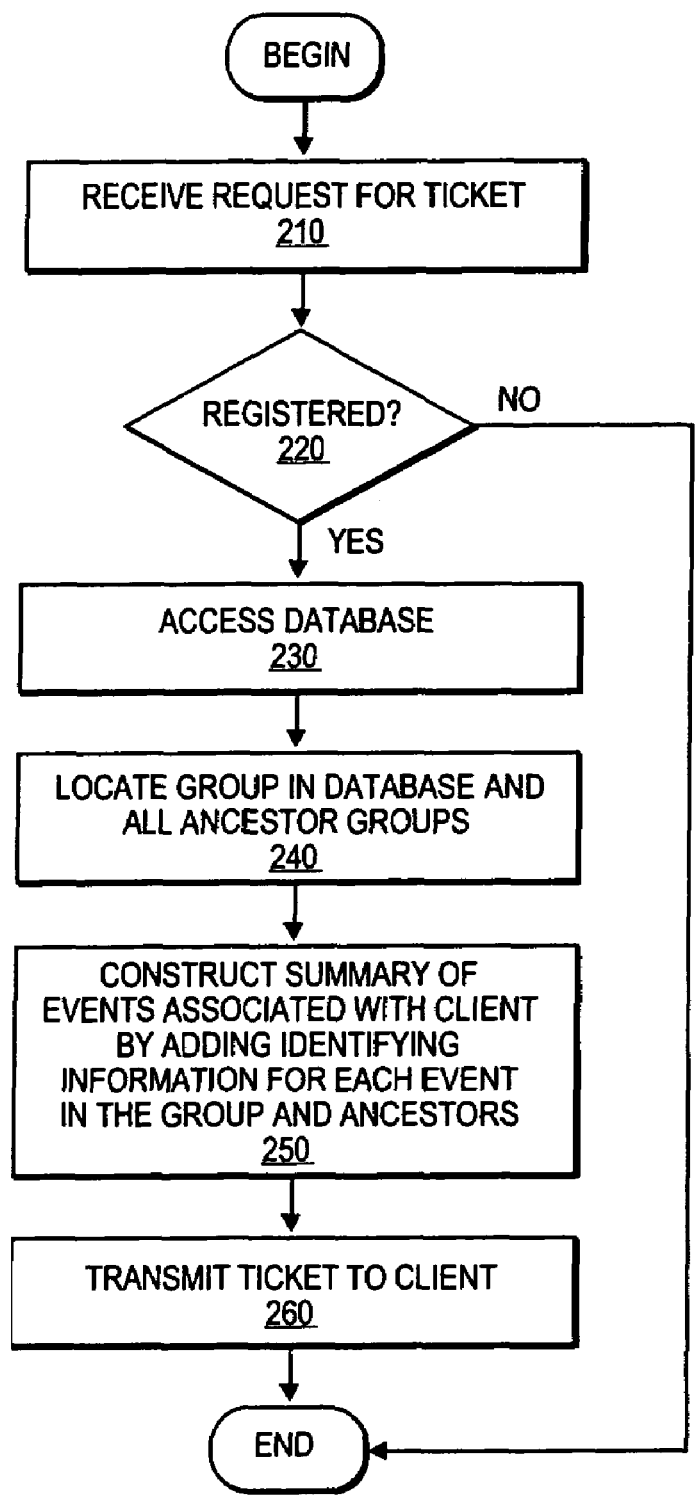
FIG. 2 demonstrates one embodiment of a ticket server.

FIG. 2 demonstrates one inventive embodiment of ticket server 130 in greater detail. As with all of the described figures, certain embodiments may include less elements, combine one or more elements, change the order of elements, and/or add to the elements shown in FIG. 2. In the illustrated embodiment however, the ticket server receives a request in block 210 from a client and in block 220 determines if the client is registered. In one embodiment, determining if the client is registered involves accessing a database of registered clients to see if the client appears in the database. This could include requiring the client to provide a login name and a password or some other verification such as a smart card. As discussed below, the request may actually pass through one or more stages of application specific client care handling before reaching ticket server 130. In which case, a client care application may determine whether or not a client is registered rather than ticketing server 130. In any case, if the client is not registered, the client is prevented from proceeding.

In block 230, the ticket server accesses a database. The database defines associations between registered users and events. Skipping briefly to FIG. 3, one embodiment of a database is illustrated. The illustrated database represents a directed acyclic graph of groups. Each group, G1 through G6, has assigned to it one or more events and clients. For instance, event E1 and client C1 are assigned to group G1. Each client assigned to a group is associated with all of the events assigned to the group. For instance, client C1 is associated with event E1. Client C1 is likely to be a sending client that can send event E1.

The database is directed and hierarchical in that clients are not only associated with events assigned to the group, but are also associated with events assigned to "ancestor" groups. An ancestor group is a group at a higher level of the hierarchy from which a current group depends. The directed nature of the database is indicated by the arrows. Group associations follow the direction of the arrows. From a given group, associated events can be accumulated by backtracking up the arrows to the root node. For instance, client C7 is assigned to group G6 so client C7 is associated with events E7 and E8 because they are assigned to the same group. Backtracking the arrow up to group G4, client C7 is also associated with event E5, and continuing up to root group G1 client C7 is also associated with event E1.

An association can apply either for sending or receiving an event. That is, with respect to one event, a client may be a sending client, and with respect to another event, a client may be a receiving client.

Figure 3:
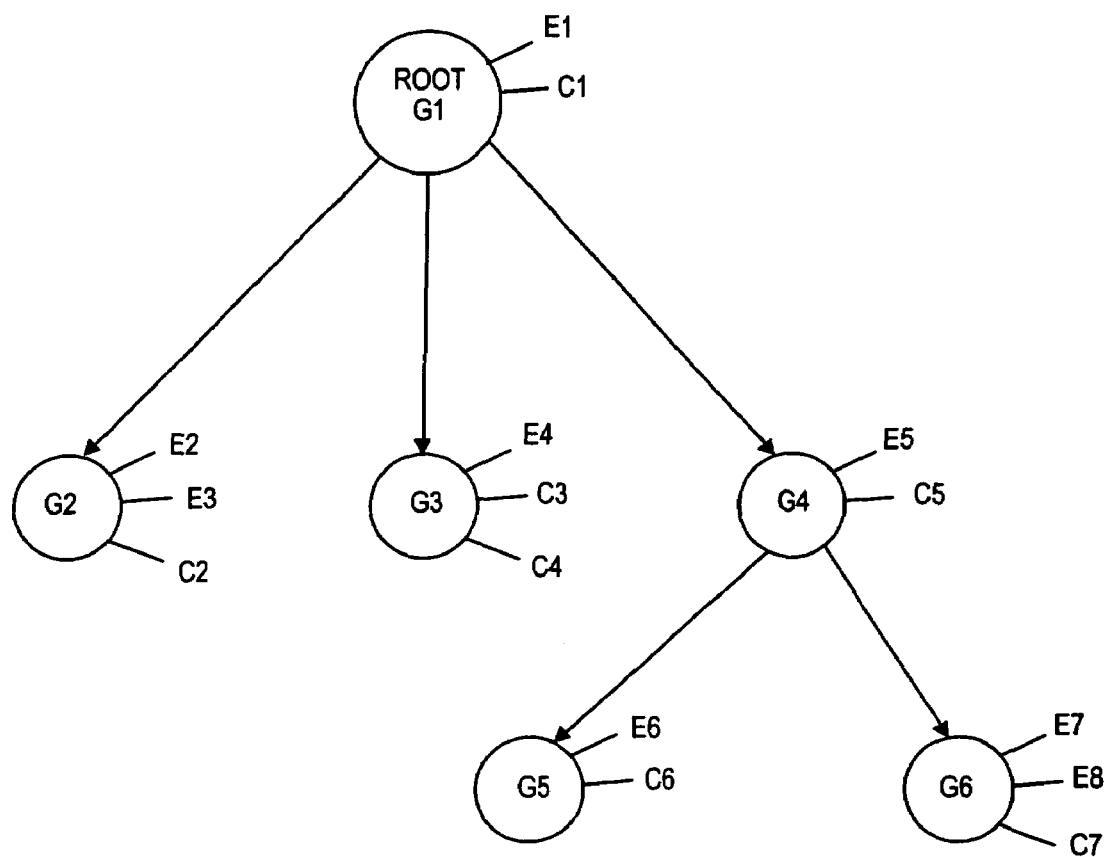
FIG. 3 illustrates one embodiment of a database.

Using a database such as the one described in FIG. 3, a summary of events to which a client is associated can be quickly constructed by following the flow directed hierarchy.

Returning to FIG. 2, in block 240, ticket server 130 locates a group to which the client is assigned and all ancestor groups. Based on the located groups, ticket server 130 constructs a summary of events associated with the client in block 250. As events are identified in the associated groups, information identifying each event is added to the summary.

Figure 4:
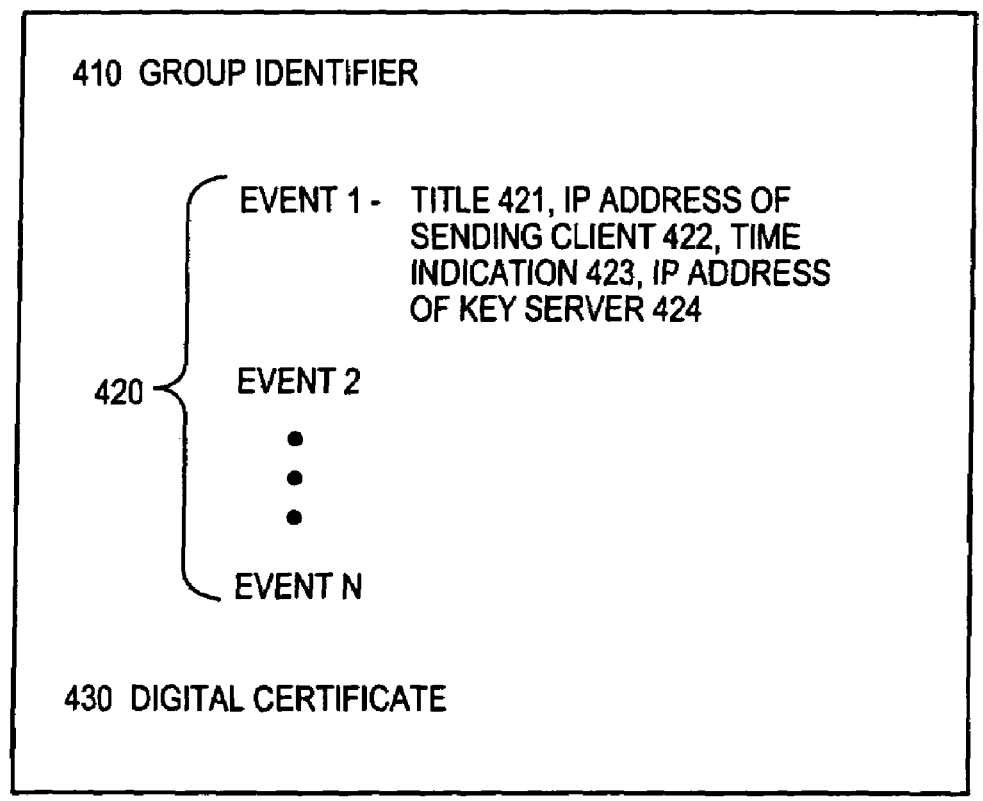
FIG. 4 illustrates one embodiment of a ticket.

Skipping briefly to FIG. 4, one embodiment of a ticket is illustrated. The illustrated ticket includes a group identifier 410. In one embodiment, all clients associated with the same group are given the same ticket. Below the group identifier, the ticket includes a list 420 of all the events, 1 through N, associated with the identified group. Each event is identified by title information 421, and each event summary includes an internet protocol (IP) address of the sending client 422 for the particular event, a time indication 423 for the particular event, and an IP address for the key server 424 that stores the encryption keys for the particular event. Alternate embodiments may include another IP destination address which in the multicast case is an IP Multicast Group address. Where all of the clients associated with a given group get the same address, a sending client will likely see its own IP address in that field. The time indicator can be a fairly complex expression. For instance, the event could repeat on a daily or weekly basis, or on certain days of the month or year.

In addition to group identifier 410 and list 420, the illustrated ticket includes digital certificate 430. Digital certificate 430 may include a digital "hash" of list 420 and may certify that the client is authorized to access a key for any of the listed events. In alternate embodiments, different digital certificates can be used for each event in list 420.

Returning again to FIG. 2, in block 260, ticket server 130 transmits the ticket, including the summary of associated clients to the client. As discussed below, a client handling system may operate between the ticket server and the actual client. In which case, ticket server 130 should transmit the ticket to the client through the client handling system.

Ticket server 130 provides a convenient way for clients to see which events are available. In alternate embodiments, in addition to or in place of providing tickets in response to requests, ticket server 130 may be configured to issue tickets under certain circumstances. For instance, for each client or for selected clients, ticket server 130 may issue tickets on a regular basis and/or whenever associated events change. Additionally, events could be prioritized based, for instance, on to which group an event is assigned. In which case, depending on the priority of a particular event, ticket server 130 may or may not issue a ticket to one or more clients based on a change in the event.

Figure 5:
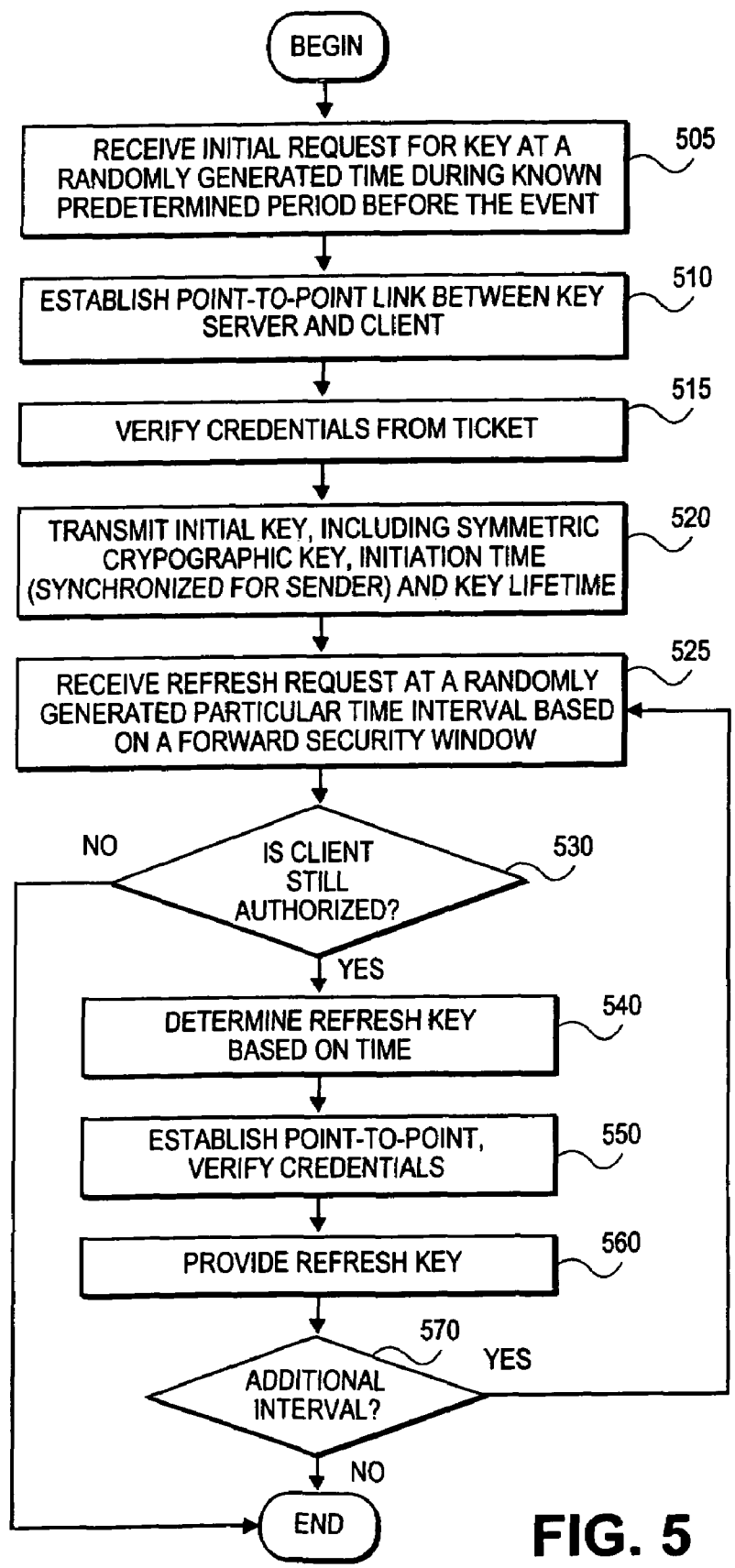
FIG. 5 demonstrates one embodiment of a key server.

Turning now to FIG. 5, one inventive embodiment of key server 140 is demonstrated. In block 505, an initial request for a key is received from a client. The initial request is received at a randomly generated instant in time during a predetermined period before the start of the event. For instance, skipping briefly to FIG. 6, the timing of one embodiment of an event is illustrated. The event will begin at the event start time 610. The predetermined period before the event start time 610 is the initial keying period 620. The request is received at some instant in time during the initial keying period 620, and the instant in time is randomly generated by the client.

In alternate embodiments, a client may access the event late. In which case, the initial request may not be received during the initial keying period 620. If a client accesses an event late, the first part of the event may not be accessible until the client receives a key.

Referring back to FIG. 5, in block 510, key server 140 establishes a point-to-point secure link with the client. In block 515, key server 140 verifies the clients credentials which are included in the request from the ticket. Any number of secure link protocols can be used, either initiated by key server 140 or the client that issued the request.

In block 520, an initial key is transmitted to the client. In the illustrated embodiment, the key includes a symmetric cryptographic key as discussed above. That is, both the sending and receiving clients use the same key to encrypt and decrypt. In addition to the cryptographic key, the illustrated embodiment includes an initiation time for the key and a life time for the key after the key is initiated.

The initiation time and life time for the key are more important for a sending client. This is because the key server and the sending client need to coordinate or synchronize which keys are made available to receiving clients and when. Therefore, a sending client and a server need to have somewhat synchronized clocks. Any number of techniques can be used to synchronize the time of day between the key server and the sending client.

A receiving client, in contrast, can just implement a key as soon as the key is received. Or, if a received key is not yet in use when the key is received, a receiving client can simply store the key until the key comes into use. Any number of techniques can be used to age a stored key so that it is not stored indefinitely if for some reason an event corresponding to the key never initiates.

In block 525, a refresh request is received. Refreshing involves changing keys after a certain duration. Refreshing, also referred to as re-keying, severs at least two purposes. First, for cryptographic reasons, it is a good idea to change keys from time to time. The longer a key is used, the more likely it is that someone will be able to crack the key and access the event without authorization. The more often keys are changed, the better the security.

A second purpose for refreshing is access revocation. That is, if a user stops being authorized to access an event part way through the event, the next time the key is refreshed for the event, the key server can prevent the user from having future access by not sending the refresh key. For example, the event may be a continuous stream, like a multicast of an all news pay television station. Keys may be refreshed at one hour intervals. If, at some point in time, a receiving client fails to pay his bill, a client care system may recognize the missed payment and send a notification to the key server indicating that the client is no longer authorized. In response to which the key server can withhold the next refresh key, effectively revoking access. For instance, referring again to FIG. 6, the event starts at event start time 610. At the end of each event interval 630, the client switches to a new key retrieved from the key server.

Figure 6:
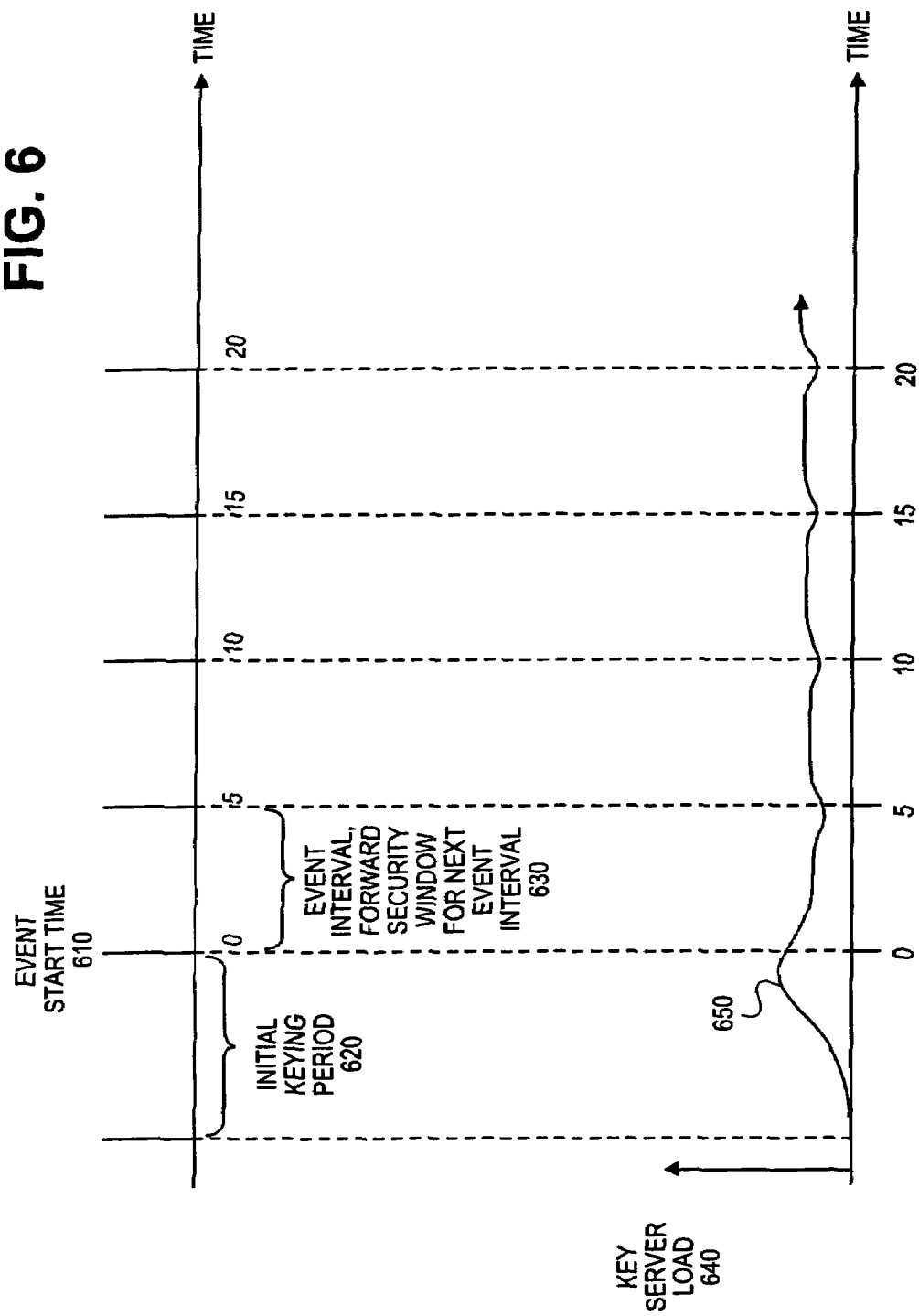
FIG. 6 illustrates event intervals and associated key server load.

As illustrated in FIG. 6, the event interval 630 is also the forward security window for the next event interval 630. That is, while the client is sending or receiving content using the current key during the current event interval, the client also accesses the key server during the forward security window to get the next refresh key. In alternate embodiments, the event interval and the forward security window do not exactly coincide. That is, the forward security window may be shorter or longer than the event interval, and the client may retrieve keys from the key server more than one event internal in advance.

Referring back to FIG. 5, still with reference to block 525, the refresh request is received at some random point in time during the forward security window. That is, the client generates a random access time during the first forward security window, and then advances the time by the duration of the event interval for each subsequent event interval. In this way, a given client will access the key server at a particular point in time with respect to the beginning of each event interval. In alternate embodiments, the client randomly generates a new access time for each forward security window.

By randomly distributing requests over the course of the event interval, the load on the key server when several clients are accessing the event is distributed over the course of the event interval. Similarly, the random instant in time during the initial keying period 620, in FIG. 6, during which the client requests the initial key, is intended to distribute the load on the key server over a period of time when many clients are accessing the key server at roughly the same time.

Distributing server load of the event intervals for refresh keys tends to work well. Unfortunately, as illustrated in FIG. 6, distributing a first request for an initial key when many requests are being processed is not always successful. Many human users of client systems are prone to wait until the last minute before the beginning of an event to try to access keys for the event. These last minute user can cause a peak 650 in the key server load 640, potentially overwhelming the key server.

Various embodiments of clients include agents for automatically accessing the key server at a random time during the initial keying period, but unless the human user has the machine turned on so that the agent can operate, no request will be made. For instance, home users are less likely to leave their machines turned on than business users. Home users are more likely to turn their machines on just moments before an event. Business users will probably not experience potential problems like peak 650 since business users often leave their machines on, allowing automatic client agents to perform the initial keying.

Figure 7:
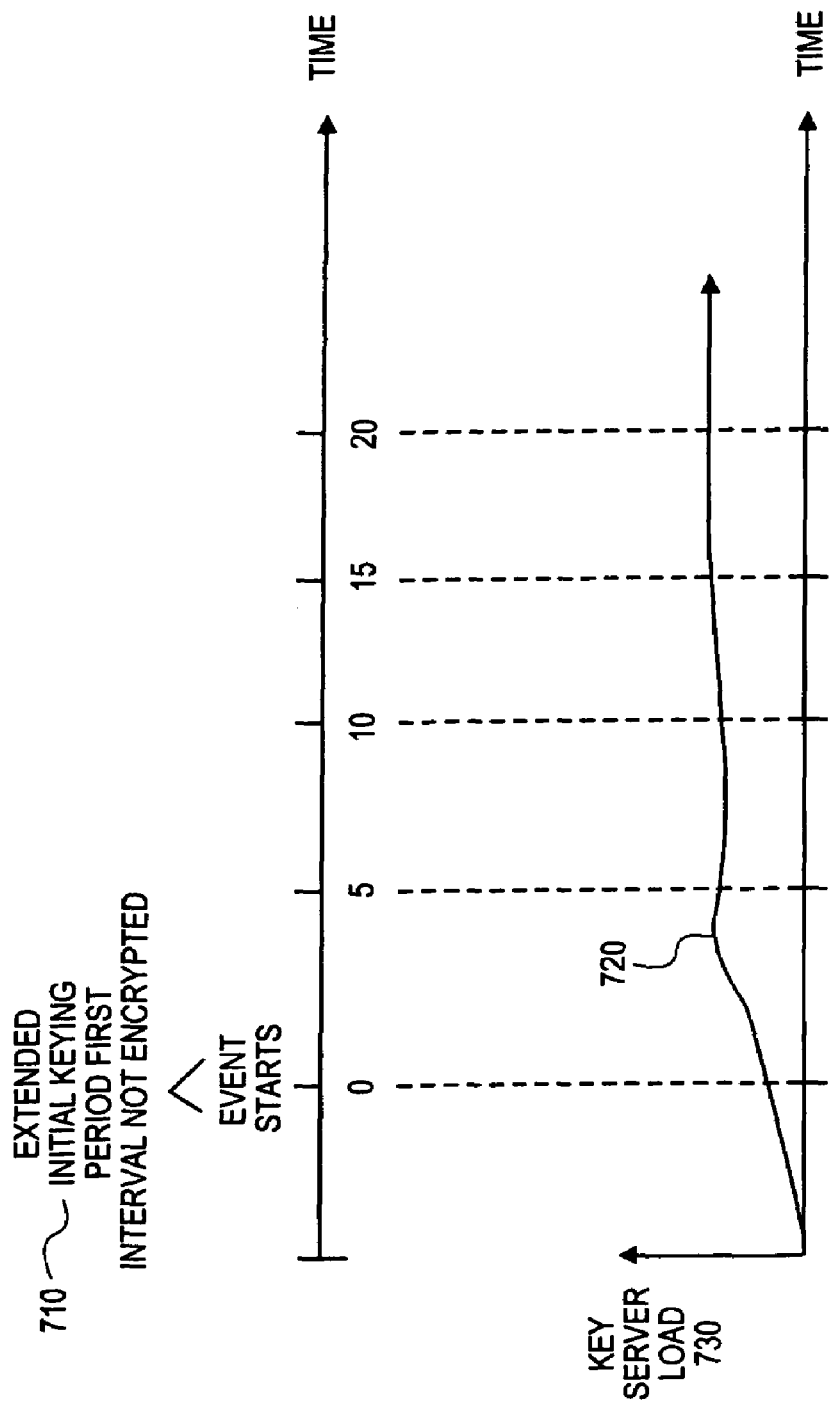
FIG. 7 illustrates event intervals and associated key server load.

FIG. 7 illustrates an embodiment of an alternate inventive approach to initial keying. In FIG. 7, the first interval after the event starts is not encrypted so that last-minute clients can begin watching the event. Any time during the extended initial keying period 710 a client can access the key server and retrieve the initial key. By allowing access to the first interval unencrypted, the load 730 on the key server is flattened out somewhat, reducing the peak load 720 compared to the approach described in FIG. 6. In alternate embodiments, more than one interval could be transmitted without encryption, or a first unencrypted interval could be longer or shorter than the rest of the event intervals.

Referring back once again to FIG. 5, now with reference to block 530, the key server checks to see if the client is still authorized. If the client is not authorized, the refresh key is not sent or, in another embodiment, not all of the necessary information is included in the refresh key that is sent to the client to effective revoke access. If the client is still authorized, the key server determines which key to send based on the current time in block 540. That is, as discussed above, for a sending client, the key server and the sending client need to be fairly closely synchronized in time so that the key server can provide the correct keys at the correct time.

In block 550, the key server and the client establish a point-to-point secure link and verify credentials. In block 560, the key server provides the refresh key over the secure link. In block 570, if there is another event interval, the process returns to block 525 to wait for the next refresh request. If there are no additional event intervals after the current one in block 570, the process ends.

Figure 8:
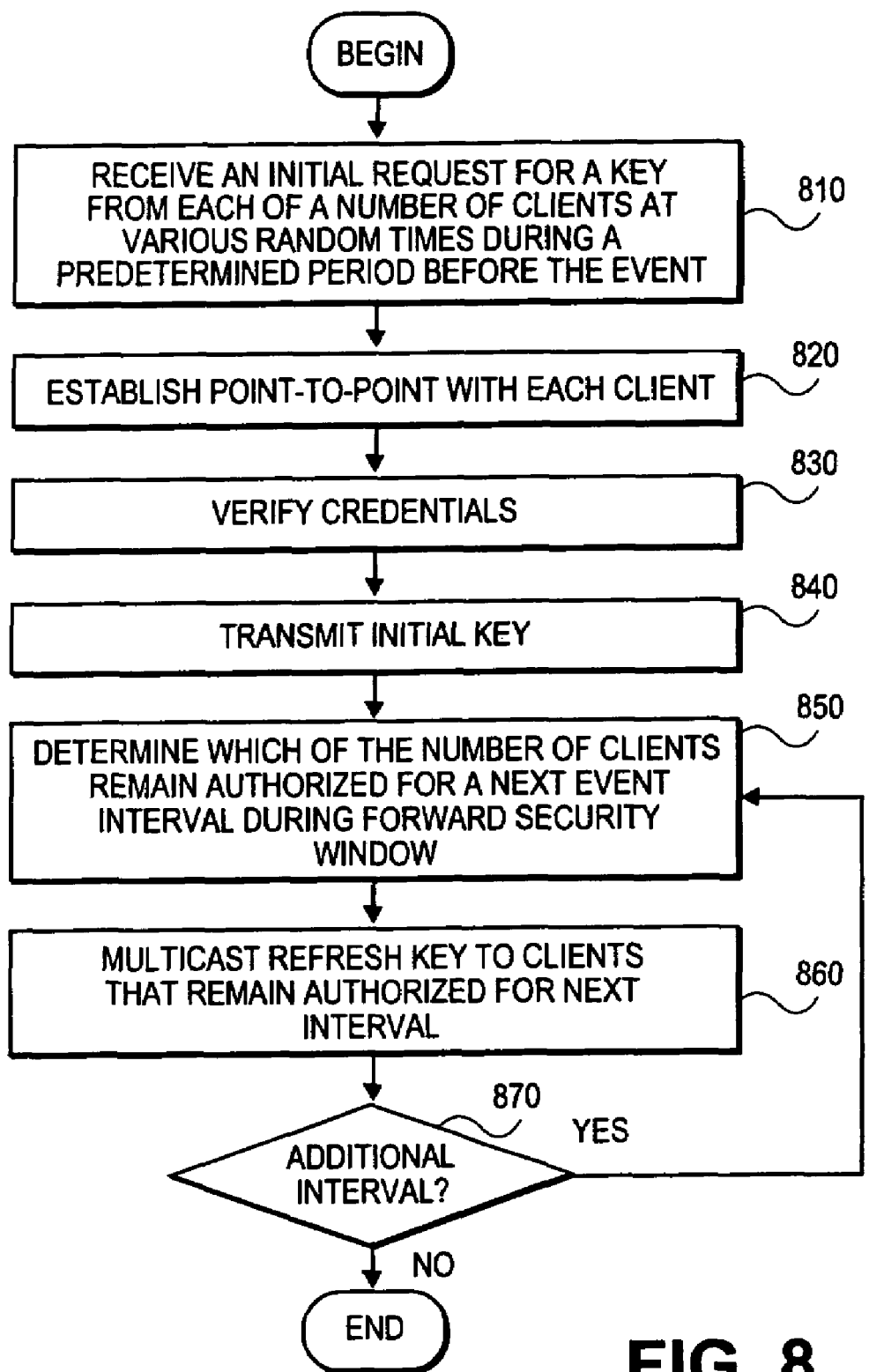
FIG. 8 demonstrates one embodiment of a key server.

FIG. 8 demonstrates another inventive embodiment of key server 140 in which refresh keys are sent by multicast rather than point-to-point. In block 810, a number of requests are received from several clients. As discussed above, the number of requests are randomly distributed over an initial keying period before the event starts. Blocks 820, 830, and 840 are similar to FIG. 5 wherein a point-to-point secure link is established, credentials are verified, and the initial key is transmitted to each authored requesting agent.

In block 850, the embodiment in FIG. 8 deviates from the embodiment in FIG. 5. In FIG. 5, the client initiates refresh requests. In the embodiment of FIG. 8, the key server determines which of the number of agents remain authorized for the next event interval based on the forward security window in block 850. In block 850, the key server multicasts the keys to the clients that remain authorized. Any number of multicasting techniques can be used. By "pushing" the refresh keys to the clients rather than pulling them (as in FIG. 5 above) the key server does not have to spend time waiting for refresh requests, establishing individual point-to-point connections, etc. In block 870, if there are no more additional event intervals, the process ends. If there are additional event intervals, the process loops back to block 850 to send the next multicast key based on the forward security window.

Figure 9:
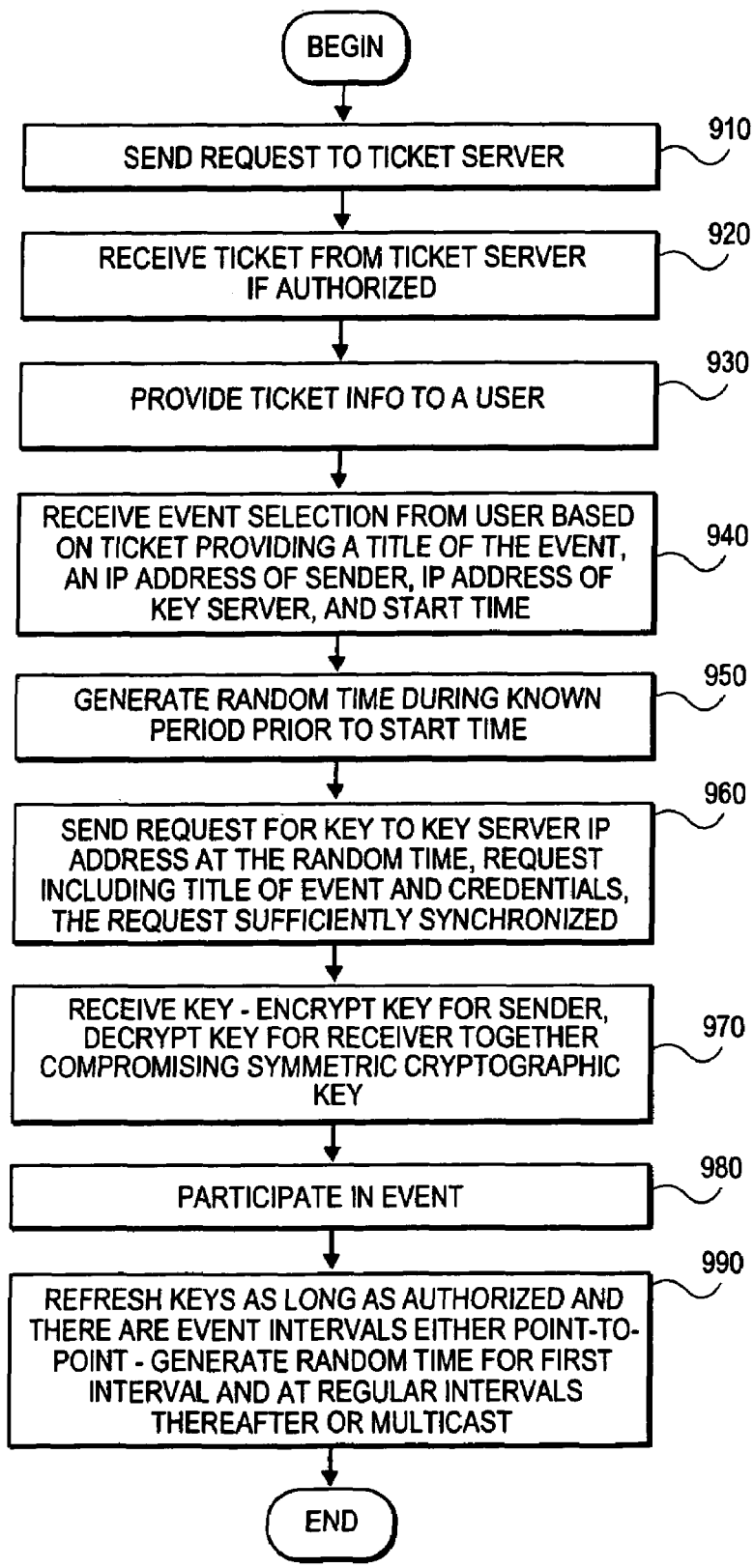
FIG. 9 demonstrates one embodiment of a client.

FIG. 9 demonstrates one inventive embodiment of a client system as it interacts with the ticket server and the key server. In block 910, the client sends a request to the ticket server. In block 920, the client receives a ticket back from the ticket server if the client is authorized to access the ticket server. In block 930, the client provides information taken from the ticket to a user. For instance, using an application program interface (API) to a graphical user interface, a user can view a representation of the events for which the client is eligible.

In block 940, the client receives a selection from the user. The selection indicates one or more of the events from the ticket. As discussed above, for each event, the ticket may include an identifier of the event, an IP address of the sender client, an IP address of the key server for the event, and a start time for the event.

In block 950, the client generates a random time during the initial keying interval and, in block 960, sends a request for a key to the key server at the random time. The request includes the identifier of the event and credentials to authenticate access authority. As discussed above, for sending clients, the time synchronization is important between the sending client and the key server.

In block 970, the client receives a key from the key server. If the client is a sending client, the key is used to encrypt the data. If the client is a receiving client, the key is used to decrypt data. In block 980, the client participates in the event by sending and/or receiving data. In block 990, the client continues to participate using refresh keys as long as the client remains authorized. The keys can be refreshed either point-to-point or multicast. For point-to-point, refresh requests are sent at a random time during a first event interval and then at regular intervals thereafter. Of course, as discussed above, in alternate embodiments the time for requests can be randomly generated for each event interval. For multicast, refresh keys are pushed to clients for each event interval until, for instance, the client is no longer authorized, the event ends, or the client indicates that it no longer wishes to participate.

Figure 10:
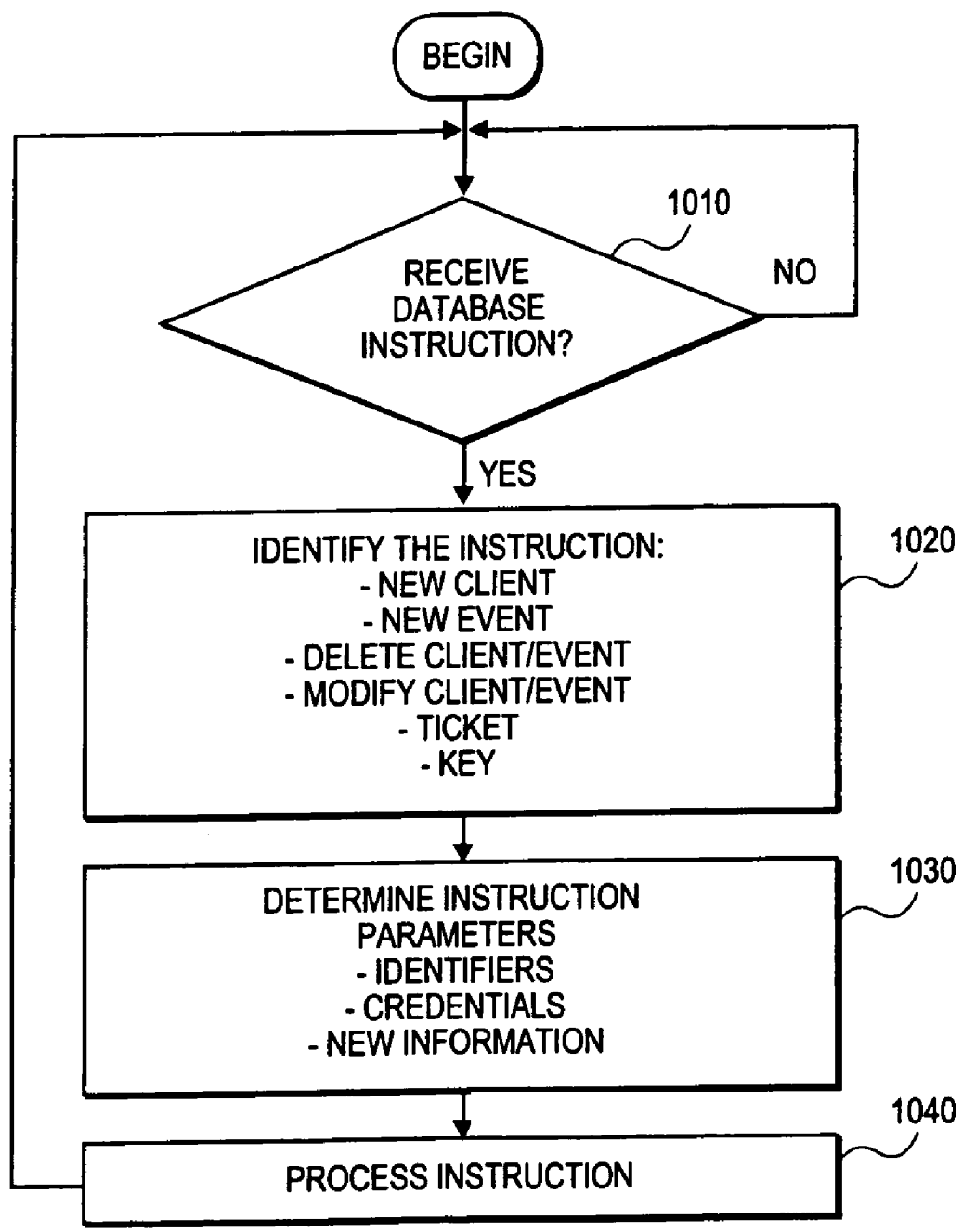
FIG. 10 demonstrates one embodiment of a management server.

FIG. 10 demonstrates one inventive embodiment of a procedure for updating and maintaining the data. In one embodiment, the procedure is performed by a management server such as management server 160 of FIG. 1. In block 1010, the management server waits for a new instruction. When a new instruction is received in block 1020, the management server identifies the instruction. In the illustrated embodiment, an instruction can be an instruction to add a new client, generate a ticket, provide a key, add a new event, delete a client or event, and modify a client or event. In block 1030, the management server identifies parameters for the instructions, such as client, event, and/or group identifiers, credentials for accessing a key, and new information for modifying old information. In block 1040, the management server processes the instruction and waits for a next instruction.

Figure 11:
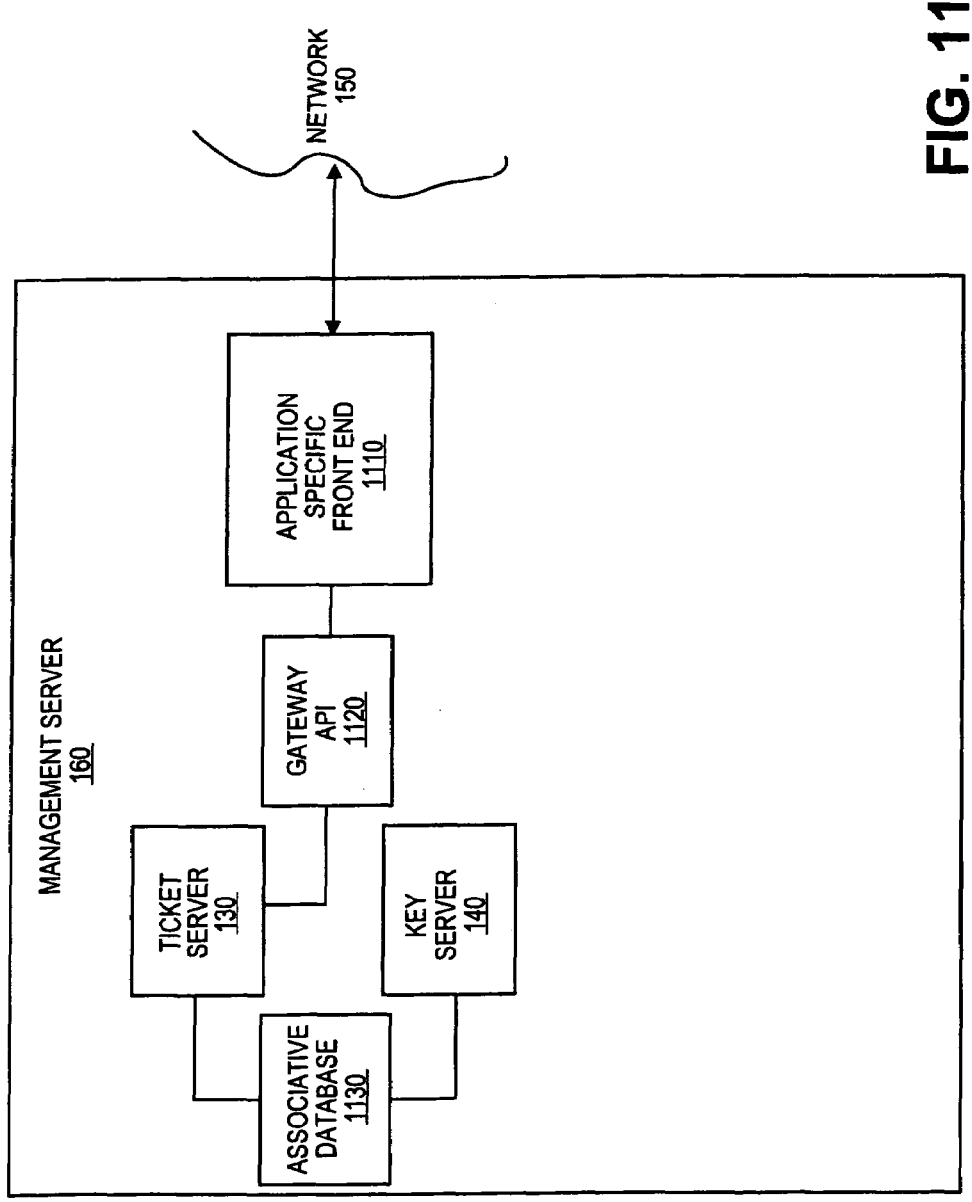
FIG. 11 illustrates one embodiment of a management server.

FIG. 11 illustrates one inventive embodiment of management server 160 including ticket server 130 and key server 140 in greater detail. In the illustrated embodiment, the severs 130 and 140 comprise a backend of the management server 160. An application specific front end 1110 handles client contact through network 150. Front end 1110 can represent any of a number of applications including a variety of e-commerce web applications, a virtual network interface for a private virtual network, etc. For instance, in one embodiment, application front end 1110 provides an e-commerce site where sending clients can post amateur audio content and receiving clients can listen to the audio content. Sending clients register with front end 1110 and submit events of audio data. As part of the registration process, the front end 1110 determines to which group or groups the sending client and the sending clients audio content should be added based on a classification of the audio content. The registration process can also include arrangements for payment, such as credit card approval, biographical information, etc.

Front end 1110 issues commands to the ticket server 130 through gateway application program interface (API) 1120. The commands, once they pass through gateway API 1120, are in a format usable by server 130 to manage data in the database. The commands may take the form of the commands described with reference to FIG. 10 previously. That is, commands to add, delete, and modify the contents of the database, such as the database illustrated in FIG. 3.

In FIG. 11, the servers 130 and 140 are shown both having access to the same database 1130. In the illustrated embodiment, the database can be used to store authorization relationships among clients and events as well as keys for accessing the various events. In alternate embodiments, such as those discussed above, the database is accessed and maintained by the ticket server alone. The key server maintains a separate database for matching requests for keys to particular events where, for instance, the key server is separately located for security purposes, and/or multiple key servers are used, each key server corresponding to only a subset of the total number of events.

Figure 12:
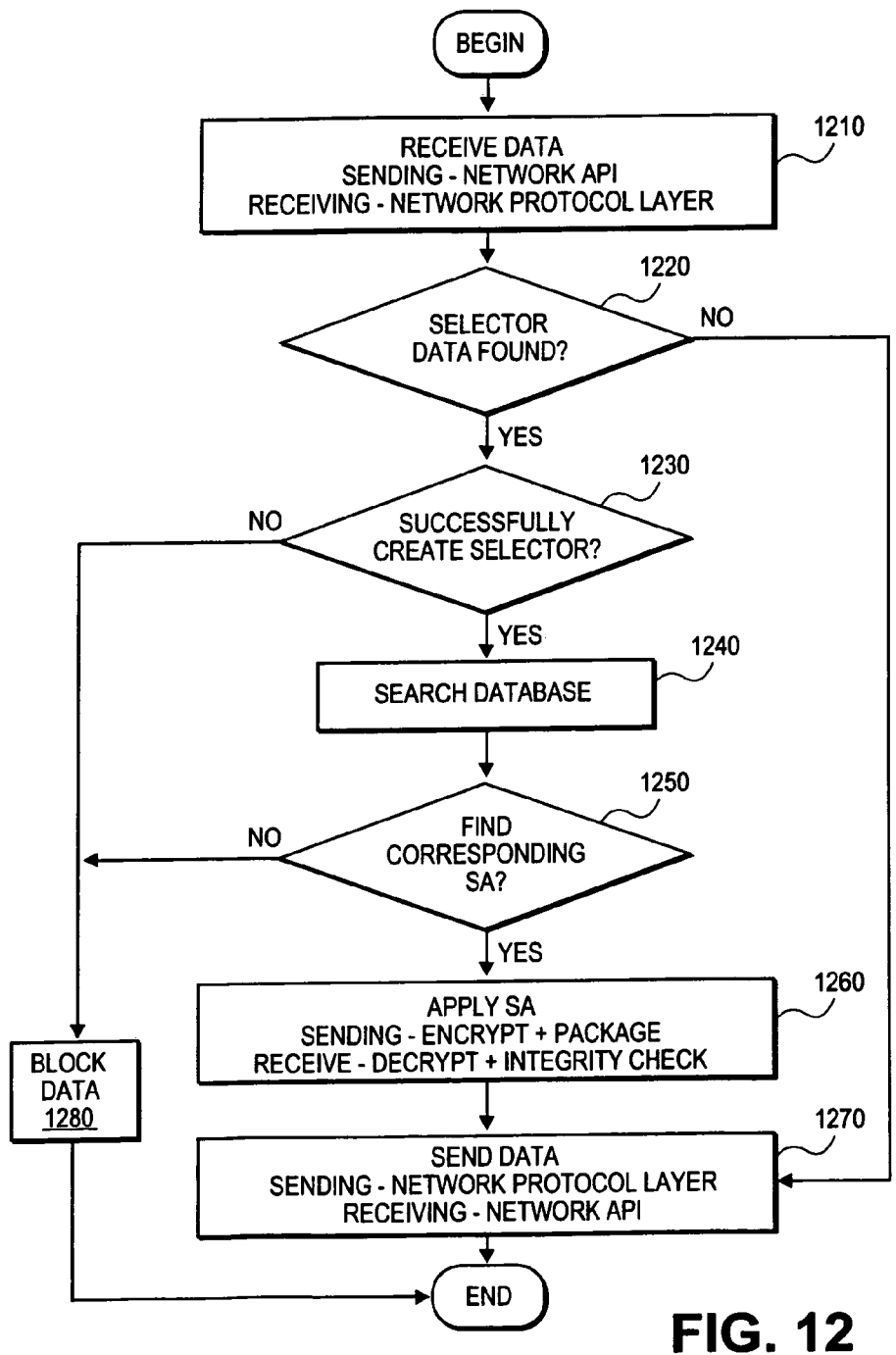
FIG. 12 demonstrates one embodiment of a security agent.

FIG. 12 demonstrates one inventive embodiment a security agent for implementing data security between two network entities, such as symmetric cryptographic keying. As discussed above, various embodiments of the inventions rely on symmetric cryptographic keying. A standardized security protocol, Internet Protocol Security (IPsec), can be used to perform the functions needed for the various embodiments of the inventions. Unfortunately, IPsec is not yet widely available, and upgrading existing systems to provide IPsec support is costly and time consuming. The embodiment illustrated in FIG. 12 provides the needed security functionality at lower cost and increased simplicity.

The embodiment illustrated in FIG. 12 can be widely used for performing security operations on data between two network entities. The security agent is not limited to the networking environment described above with reference to FIG. 1, although it can be used in such an environment. As with other figures described herein, alternate embodiments may not require all of the elements, may include one or more additional elements, and may combine one or more elements shown in FIG. 12.

FIG. 12 demonstrates the functions of one security agent. A security agent works in concert with another security agent to provide symmetric network communications. That is, a sending agent applies one or more transformations to data and a receiving agent applies inverse transformations to reproduce the original data. In one embodiment, using a pair of security agents, "plaintext" data is transformed into "ciphertext" data, sent over a network, and transformed back into plaintext data.

In block 1210, the security agent receives data. In block 1220, the security agent searches the data for selector data. Depending on whether the data is outbound or inbound, selector data could include an IP address to which the data is directed, an IP address from which the data is received, a port to which the data is directed, and/or a port from which the data was received. Selector data can also include a tag in a security header, a failure to pass an integrity check, etc. If no selector data is found, the security agent presumes that the data is not related to the security agent's functions and passes the data along unchanged in block 1270.

If selector data is found in block 1220, the security agent then tries to create a selector from the selector data. A selector is part of a selector/security association pair otherwise known as keying information. For instance, as described above, when a client obtains a key from a key server, the key comprises a selector/security association pair that is to be used by both a sending client and a receiving client to secure participation in the corresponding event. The selector indicates what data should be operated on (namely the event data) as well as what security association should be used (in particular which encryption key should be used). In various embodiments, security associations are not limited strictly to encryption and decryption. Security associations may call for encryption, decryption, integrity check, or no action at all beyond removing any special packaging added to the data. One or more selectors/security associations pairs may be stored and applied to one or more events.

If the selector is not successfully created in block 1230, the data is prevented for going further in block 1280. This may happen where certain selector fields are detected in the data, but the data within those fields has been corrupted.

If, in block 1230, the selector is successfully created, the selector can be used to search a database that stores one or more selector/security association pairs to identify the corresponding security association in block 1240. If in block 1250 no corresponding security association is found, the data is prevented from proceeding in block 1280. Without a security association corresponding to the selector, the security agent cannot properly act on the data. Passing the data may cause various unintended consequences including system crashes.

If however, in block 1250, a corresponding security association was found, the security agent applies the security association to the data in block 1260. In block 1270, the data is passed along.

Figure 13:
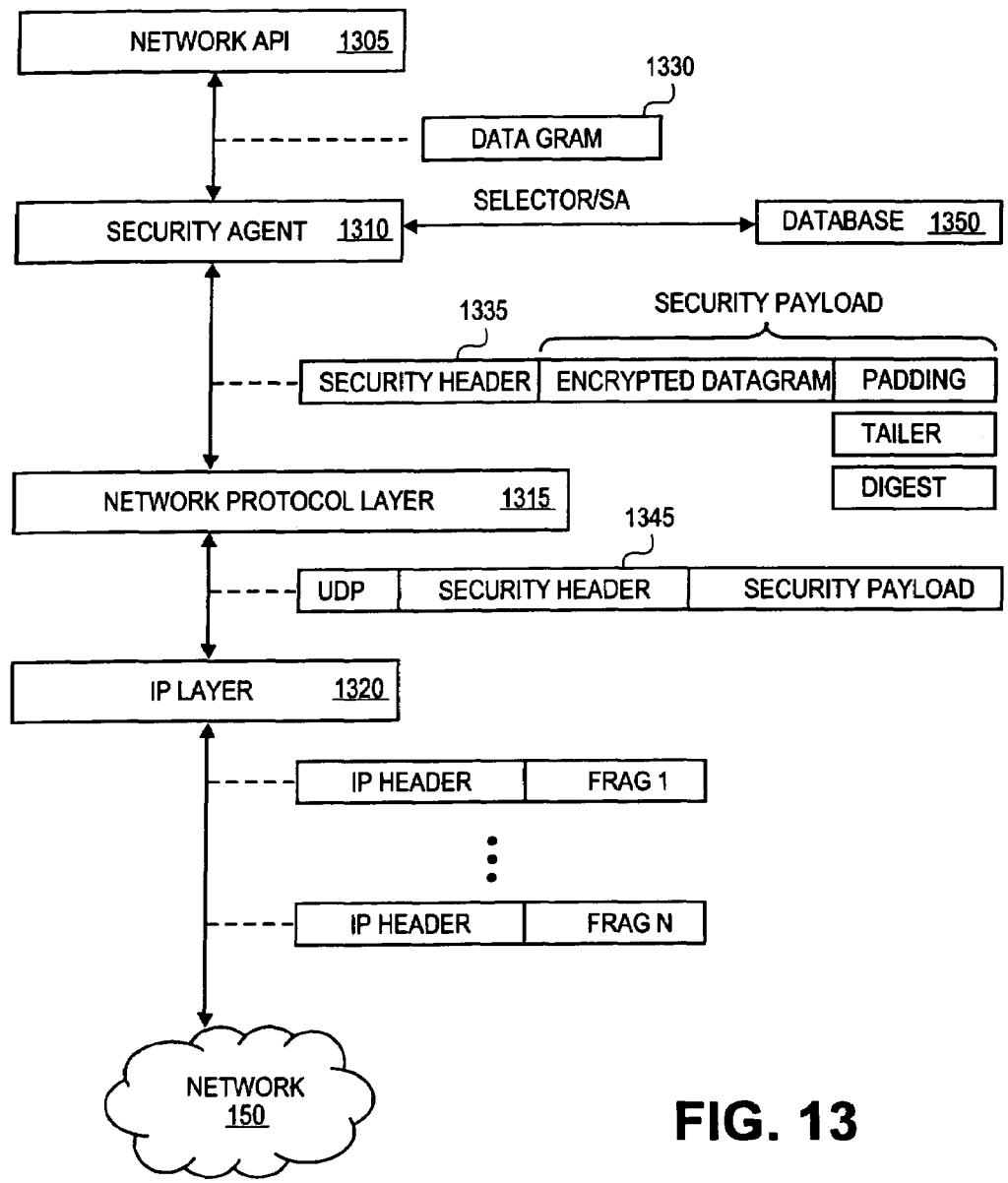
FIG. 13 illustrates one embodiment of a security agent.

FIG. 13 illustrates one embodiment of a security agent 1310 operating between the network API layer 1305 and network protocol layer 1315. Data traffic from an application (not shown) that is intended for network 150 goes through network API layer 1305 and arrives at security agent 1310 in the form of a data-gram 1330. If security agent 1310 can identify a selector in data-gram 1330 and identify a corresponding security association in database 1350, security agent 1310 will apply the security association to data-gram 1330. In the illustrated embodiment, the result is data packet 1335 which includes a special security header and security payload. The security payload includes the encrypted data gram, padding, a security trailer, and a digest.

The data packet 1335 goes through network protocol layer 1315 as if it were regular data, and is placed in data packet 1345. IP layer 1320 fragments the data as needed, attaches IP headers, and sends the data onto network 150.

For inbound traffic, IP layer 1320 reassembles the data and strips off the IP headers. Network protocol layer 1315 strips off its header and passes the data packet 1335 to security agent 1310. Assuming security agent 1310 is able locate a corresponding security association in database 1350 based on a selector created from the data, security agent 1310 reverses any security operations on the data. If no selector is found, then no security operations were done to the data so no operations need to be reversed.

The operations of security agent 1310 are transparent to the network API 1305 and the network protocol layer. The security agent works completely independent of the network or the application based on selector/security associations previously stored in database 1350.

Where the security agent of FIGS. 12 and/or 13 is used in combination with the networking environment of FIG. 1, the database of selector/security association pairs is populated by a client when the client access key server 140 and receives keying information.

Figure 14:
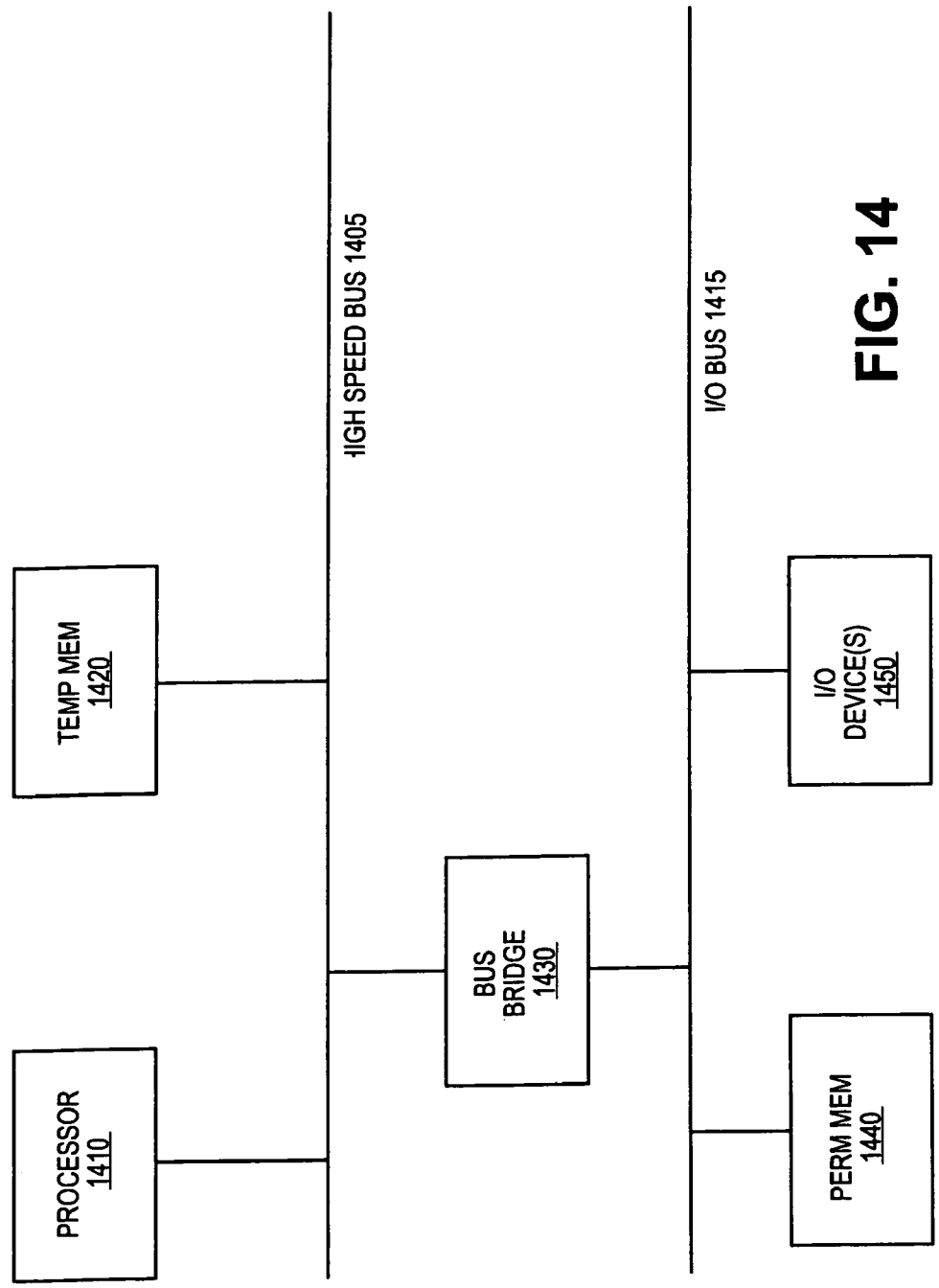
FIG. 14 illustrates one embodiment of a hardware system.

FIG. 14 illustrates one embodiment of a hardware system intended to represent a broad category of computer systems such as personal computers, workstations, and/or embedded systems. In the illustrated embodiment, the hardware system includes processor 1410 coupled to high speed bus 1405, which is coupled to input/output (I/O) bus 1415 through bus bridge 1430. Temporary memory 1420 is coupled to bus 1405. Permanent memory 1440 is coupled to bus 1415. I/O device(s) 1450 is also coupled to bus 1415. I/O device(s) 1450 may include a display device, a keyboard, one or more external network interfaces, etc.

Certain embodiments may include additional components, may not require all of the above components, or may combine one or more components. For instance, temporary memory 1420 may be on-chip with processor 1410. Alternately, permanent memory 1440 may be eliminated and temporary memory 1420 may be replaced with an electrically erasable programmable read only memory (EEPROM), wherein software routines are executed in place from the EEPROM. Some implementations may employ a single bus, to which all of the components are coupled, or one or more additional buses and bus bridges to which various components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

Figure 15:
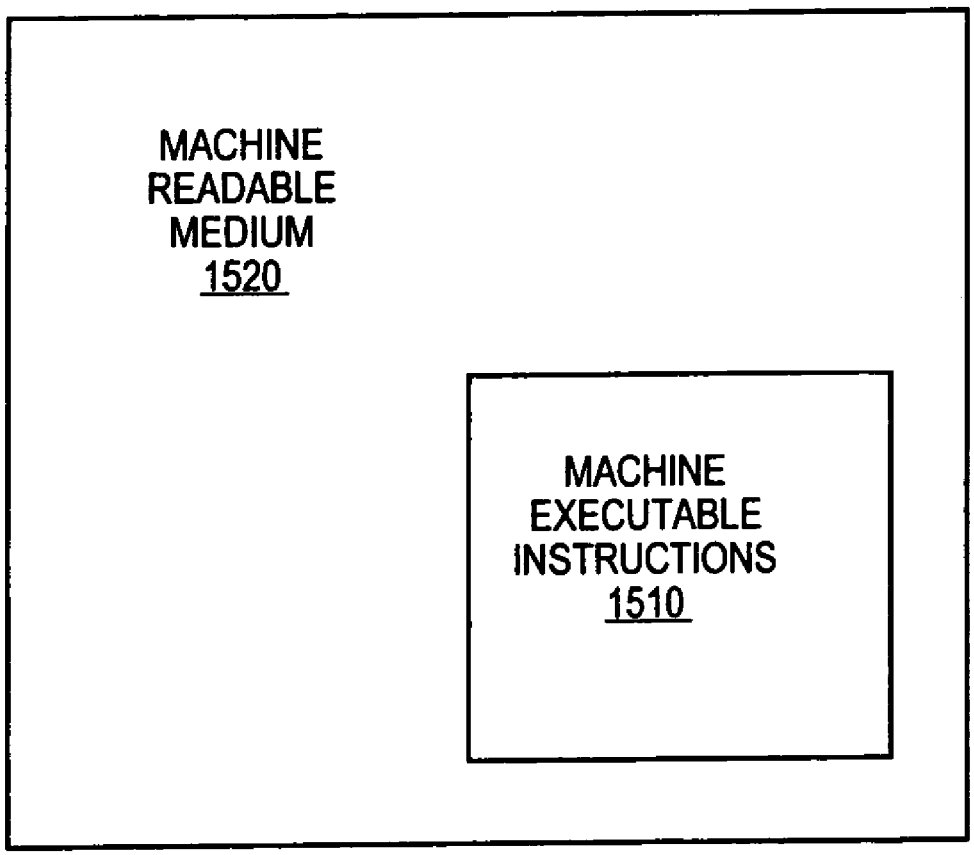
FIG. 15 illustrates one embodiment of a machine readable storage medium.

In one embodiment, the one or more of the inventive embodiments, as described above, is implemented using one or more computers such as the hardware system of FIG. 14. Where more than one computer is used, the systems can be coupled to communicate over an external network, such as a local area network (LAN), an IP network, etc. In one embodiment, the present invention is implemented as software routines executed by the computer(s). For a given computer, the software routines can be stored on a storage device, such as permanent memory 1440. Alternately, as shown in FIG. 15, the software routines can be machine executable instructions 1510 stored using any machine readable storage medium 1520, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 1450. The instructions may be copied from the storage device into temporary memory 1420 and then accessed and executed by processor 1410. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. In another example, the present invention could be implemented in one or more ASICs on additional circuit boards and the circuit boards could be inserted into the computer(s) described above. In another example, field programmable gate arrays (FPGAs) or static programmable gate arrays (SPGA) could be used to implement the present invention. In yet another example, a combination or hardware and software could be used to implement the present invention.

Thus, a method and apparatus for ticketing and keying network content is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. Method for facilitating access to an event, comprising:
receiving a request for a ticket at a ticket server, said request being from a receiving client, wherein the receiving client is to participate in the event transmitted by a sending client, receipt of said ticket to qualify the receiving client to access a key from a key server upon presentation of information derived from the ticket to the key server, wherein the key is a symmetric key that the sending client uses to encrypt the event and the receiving client uses to decrypt the event, the symmetric key being refreshed at relatively short intervals compared to a duration of the event, the refreshed symmetric keys being transmitted from the key server to said receiving client during the event;
determining if the receiving client is authorized to receive the key; and
transmitting the ticket from the ticket server to the receiving client if the receiving client is authorized.

2. The method of claim 1 wherein determining if the receiving client is authorized comprises:
accessing a database that defines authorized clients; and
determining if the receiving client is among the authorized clients defined by the database.

3. The method of claim 1 further comprising:
accessing a database that defines associations between authorized clients and events;
constructing a summary of all events to which the receiving client is associated based on the database; and
including the summary in the ticket.

4. The method of claim 3 wherein the database comprises a directed hierarchy of groups, wherein each group comprises at least one member client and/or at least one member event, and wherein constructing the summary comprises:
locating a particular group in the database to which the receiving client is a member client;
adding identifying information to the summary for each event, if any, belonging to the particular group;
locating at least one ancestor group to the particular group in the directed hierarchy of groups; and
adding identifying information to the summary for each event, if any, belonging to the at least one ancestor group.

5. The method of claim 1 wherein the ticket comprises at least one of an identifier that indicates a group to which the receiving client belongs, a list identifying at least one event for which the receiving client is qualified, and a digital certificate that indicates that the receiving client is authorized for each listed event.

6. The method of claim 5 wherein the list comprises at least one of a title of each listed event, an internet protocol (IP) address for each listed event, a time indication for each listed event, and an IP address for a key server corresponding to each listed event.

7. A method for facilitating security for an event comprising:
receiving a request for a first key at a key server, said request being received from a receiving client, said first key to facilitate access to an event by the receiving client, wherein the first key is a symmetric key that a sending client uses to encrypt the event and the receiving client uses to decrypt the event;
determining if the receiving client is qualified to receive the key based on information in said request derived from a ticket previously obtained by the receiving client from a ticket server;
transmitting the first key from the key server to the receiving client if the receiving client is qualified; and
at relatively short intervals compared to a duration of the event, transmitting refresh keys to the receiving client, each refresh key being a symmetric key that the sending client uses to encrypt the event and the receiving client uses to decrypt the event.

8. The method of claim 7 wherein each of said first and refresh keys comprises at least one of an initiation time for use of the key and a lifetime for the key.

9. The method of claim 7 wherein the request comprises an initial request for the event, and wherein receiving the initial request comprises:
receiving the initial request at a particular time during a predetermined period before the event, said particular time being randomly generated by the receiving or sending client.

10. The method of claim 7 further comprising:
establishing a secure point-to-point link between the key server and the receiving client in response to the requests, wherein said keys are transmitted over the secure point-to-point link.

11. The method of claim 7, further comprising:
receiving a plurality of refresh requests, each of the plurality of refresh requests corresponding to one of a plurality of forward security windows associated respectively with said relatively short intervals during the event, wherein each refresh request is received at a particular time within the corresponding forward security window, said particular time being randomly generated by the receiving or sending client for a first forward security window and applied for each forward security window thereafter.

12. The method of claim 7 wherein the first key corresponds to a first interval of the event, and wherein the method further comprises:
receiving a refresh key request from the receiving client corresponding to a subsequent interval of the event;
determining if the receiving client remains qualified to receive a refresh key; and
transmitting the refresh key to the receiving client if the receiving client remains qualified.

13. The method of claim 7 wherein the first key corresponds to a first interval of the event, and wherein the method further comprises:
receiving a plurality of additional requests for the first key from a plurality of additional receiving clients;
determining if each of the plurality of additional receiving clients are qualified to receive the first key based on information derived from a ticket previously obtained by each of the plurality of additional receiving clients from the ticket server;
transmitting the first key to each of the plurality of additional receiving clients that are qualified;
receiving a refresh key request from each of said receiving clients corresponding to a subsequent interval of the event;
determining if each receiving client remains qualified to receive a refresh key; and
transmitting the refresh key to that receiving client if that receiving client remains qualified.

14. The method of claim 13 further comprising:
establishing a secure link from the key server to the receiving client and the plurality of additional receiving clients, wherein the refresh key is transmitted through the secure link.

15. The method of claim 7 wherein the key server has a synchronized time with respect to the sending client for the event to within a margin of error, and wherein the method further comprises:
determining which among said first key and said plurality of refresh keys to use based on the synchronized time.

16. The method of claim 7 wherein determining comprises at least one of:
verifying that the request is received within a predetermined period before the event or time interval during the event; and
verifying that the request includes credentials for the event.

17. The method of claim 7 wherein the request is received within a predetermined time frame after the event starts, wherein said event is not encrypted during the predetermined time.

18. A machine readable storage medium having stored thereon machine executable instructions, execution of said machine executable instructions to implement a method for accessing event comprising:
obtaining a ticket at a receiving client from a ticket server, said ticket to facilitate access to the event by the receiving client, said ticket comprising at least one indication that the client is authorized to participate in the event;
submitting information derived from said at least one indication in said ticket to a key server;
obtaining a plurality of keys at the receiving client from the key server, each key corresponding to a one of a plurality of time intervals that are relatively short compared to a duration of the event, each key being a symmetric key used by a sending client to encrypt the event and used by the receiving client to decrypt the event; and
participating in the event based on the key.

19. The machine readable storage medium of claim 18 wherein obtaining the ticket comprises:
sending a request to the ticket server for a list of events for which the receiving client is qualified to participate.

20. The machine readable medium of claim 18, further comprising:
receiving an indication to participate in the event;

wherein said submitting comprises initiating a transaction with the key server at a location indicated by the ticket and within a time frame prior to a start time of the event indicated by the ticket.

21. A machine readable storage medium having stored thereon machine executable instructions, the execution of said machine executable instructions to implement a method facilitating access to an event comprising:
   receiving a request for a key at a key server, said request being received from a receiving client, said key to facilitate an event between the receiving client and a sending client, wherein the key is a symmetric key that the sending client uses to encrypt the event and the receiving client uses to decrypt the event, the key being refreshed at relatively short intervals compared to a duration of the event;
   determining if the receiving client is qualified to receive the key based on a ticket previously obtained by the receiving client from a ticket server; and
   transmitting the key from the key server to the receiving client if the receiving client is qualified.

22. The machine readable storage medium of claim 21 wherein the request comprises an initial request for the event, and wherein receiving the initial request comprises:
   receiving the initial request at a particular time during a predetermined period before the event, said particular time being randomly generated by the receiving client.

23. The machine readable storage medium of claim 21 further comprising:
   establishing a secure point-to-point link between the key server and the receiving client in response to the request, wherein the key is transmitted over the secure point-to-point link.

24. The machine readable storage medium of claim 21 wherein the request comprises one of a plurality of refresh requests, wherein each of the plurality of refresh requests corresponds to one of a plurality of forward security windows during the event, wherein each of the plurality of forward security windows comprises a repeated time interval, and wherein receiving the refresh request comprises:
   receiving the refresh request at a particular time within a corresponding forward security window, said particular time being randomly generated by the receiving or sending client for a first forward security window and applied at the repeated time interval thereafter.

25. The machine readable storage medium of claim 21 wherein the key corresponds to a first interval of the event, and wherein the method further comprises:
   determining if the receiving client remains qualified to receive a refresh key; and
   transmitting the refresh key to the receiving client if the receiving client remains qualified, said refresh key corresponding to a subsequent interval of the event.

26. The machine readable storage medium of claim 21 wherein the key corresponds to a first interval of the event, and wherein the method further comprises:
   receiving a plurality of additional requests for the key from a plurality of additional receiving clients;
   determining if the each of the plurality of additional receiving clients are qualified to receive the key based on a ticket previously obtained by each of the plurality of additional receiving clients from the ticket server;
   transmitting the key to each of the plurality of additional receiving clients that are qualified;
   determining if the receiving client and each of the plurality of additional receiving clients remain qualified to receive a refresh key; and
   transmitting the refresh key to the receiving client if the receiving client remains qualified and to each of the plurality of additional receiving clients that remain qualified, said refresh key corresponding to a subsequent interval of the event.

27. The machine readable storage medium of claim 26 wherein the request is received within a predetermined time frame after the event starts, and wherein said event is not encrypted during the predetermined period time frame.

28. A ticket server apparatus for facilitating access to an event comprising:
   a port to receive a request for a ticket, said request being from a receiving client, said ticket to qualify the receiving client to access a key from a key server upon presentation of information derived from the ticket to the key server, wherein the key is a symmetric key used by a sending client to encrypt the event and used by the receiving client to decrypt the event, the symmetric key being refreshed at relatively short intervals compared to a duration of the event, the refreshed symmetric keys being transmitted from the key server to said receiving client during the event; and
   circuitry to determine if the receiving client is authorized to receive the key and to transmit the ticket through the port to the receiving client if the receiving client is authorized.

29. A key server apparatus for facilitating access to an event comprising:
   a port to receive a request for a key, said request being received from a receiving client, wherein the key is a symmetric key used by a sending client to encrypt the event and used by the receiving client to decrypt the event, the symmetric key being refreshed at relatively short intervals compared to a duration of the event, the refreshed symmetric keys being transmitted from the key server to said receiving client during the event; and
   circuitry to determine if the receiving client is qualified to receive the key based on a ticket previously obtained by the receiving client from a ticket server, and to transmit the key through the port to the receiving client if the receiving client is qualified.

30. A method for facilitating transmission of an event from a sending client to a plurality of receiving clients, the sending client transmitting event content to the receiving clients during an event interval having an event duration, the method comprising:
   at a key server, sending a plurality of symmetric keys to each receiving client, each symmetric key being associated with a different time window within said event interval, each time window being of relatively short duration compared to the event duration, each symmetric key being used by the sending client to encrypt event content corresponding to said symmetric key's associated time window and being used by each receiving client to decrypt that resulting encrypted event content;
   wherein, for each receiving client, each symmetric key is transmitted over a distinct point-to-point link between the key server and that receiving client; and
   wherein each symmetric key is transmitted to said plurality of receiving clients at randomly selected points in time prior to said symmetric key's associated time window, thereby promoting avoidance of undesirable traffic peaks at said key server.

31. The method of claim 30, wherein said randomly selected points in time result from independent computations performed at each of said plurality of receiving clients.

32. The method of claim 30, said event interval having a start time and including a first time window immediately following said start time, wherein said sending client does not encrypt the event content corresponding to said first time window, thereby promoting avoidance of an undesirable traffic peak at said key server just prior to said start time.

33. The method of claim 30, wherein said time windows within said event interval are non-overlapping and are of substantially equal duration less than one-fourth of the event duration.

34. The method of claim 30, wherein said event duration is continuous, wherein said time windows are of substantially equal duration on the order of one hour.

35. The method of claim 30, said time windows being non-overlapping and of substantially equal duration, said event interval having a start time and including a first time window immediately following said start time, the method further comprising:

at the key server, receiving an initial key request from one of said receiving clients at an initial randomly selected point in time prior to said start time, said initial randomly selected point in time lying ahead of said start time by a first time difference;

sending a first symmetric key to said receiving client upon receipt of said initial key request, said first symmetric key corresponding to said first time window; and for each subsequent time window, automatically sending the symmetric key associated with that subsequent time window to said receiving client without requiring further key requests from said receiving client, wherein said associated symmetric key is sent in advance of said subsequent time window by said first time difference.

36. The method of claim 30, said time windows being non-overlapping and of substantially equal duration, said event interval having a start time and including a first time window immediately following said start time, the method further comprising:

at the key server, receiving an initial key request from one of said receiving clients at an initial randomly selected point in time prior to said start time;

sending a first symmetric key to said receiving client upon receipt of said initial key request, said first symmetric key corresponding to said first time window; and for each subsequent time window, sending the symmetric key associated with that time window to said receiving client upon receiving a subsequent key request therefrom, wherein said subsequent key request is received at a random interval relative to other subsequent key requests for other subsequent time windows.

\* \* \* \* \*